United States Patent
Hu et al.

(10) Patent No.: US 10,354,685 B1
(45) Date of Patent: Jul. 16, 2019

(54) SLIDER AIR-BEARING SURFACE DESIGNS WITH SEGMENTED PARTICLE-TRAPPING STRUCTURES

(71) Applicant: Western Digital Technologies, Inc., San Jose, CA (US)

(72) Inventors: Yong Hu, San Ramon, CA (US); Weidong Huang, Palo Alto, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/908,685

(22) Filed: Feb. 28, 2018

(51) Int. Cl.
*G11B 5/60* (2006.01)
*G11B 5/40* (2006.01)
*G11B 33/14* (2006.01)
*G11B 5/187* (2006.01)

(52) U.S. Cl.
CPC .......... *G11B 5/6082* (2013.01); *G11B 5/1871* (2013.01); *G11B 5/40* (2013.01); *G11B 5/6005* (2013.01); *G11B 33/1446* (2013.01)

(58) Field of Classification Search
None
See application file for complete search history.

(56) References Cited

U.S. PATENT DOCUMENTS

| | | | | |
|---|---|---|---|---|
| 5,490,025 A | * | 2/1996 | Dorius | G11B 5/6082 360/236.4 |
| 5,751,517 A | * | 5/1998 | Agarwal | G11B 5/6082 360/235.4 |
| 6,055,127 A | * | 4/2000 | Boutaghou | G11B 5/6005 360/236 |
| 6,226,859 B1 | | 5/2001 | Dorius et al. | |
| 6,233,118 B1 | * | 5/2001 | Boutaghou | G11B 5/10 360/235.4 |
| 6,594,113 B2 | * | 7/2003 | Rao | G11B 5/6005 360/235.7 |
| 6,744,601 B2 | * | 6/2004 | Brand | G11B 5/60 360/235.6 |
| 6,920,015 B2 | | 7/2005 | Mundt et al. | |
| 7,515,384 B2 | | 4/2009 | Uang | |
| 7,760,468 B2 | | 7/2010 | Cha et al. | |
| 8,077,559 B1 | | 12/2011 | Miyauchi et al. | |

(Continued)

OTHER PUBLICATIONS

J. L. Brand, M. Roy, and A.D. Frenz, "Designing, Modeling, and Testing Particle Robust Air Bearings for Perpendicular Recording Media," in Asia-Pacific Magnetic Recording Conference, 2006.

*Primary Examiner* — William J Klimowicz
(74) *Attorney, Agent, or Firm* — Jacobsen IP Law

(57) ABSTRACT

Disclosed herein are sliders that include segmented structures for trapping particles while providing adequate airflow to meet pitch stability objectives. A slider includes a vertical structure and a segmented structure disposed adjacent to the base of the vertical structure. The segmented structure comprises a plurality of particle-trapping segments and at least one gap, where each pair of two consecutive particle-trapping segments is separated by a gap. When the slider ABS faces upward, each gap is at a level that is higher than the floors of the particle-trapping segments on either side of the gap. In some embodiments, the segmented structure includes at least three particle-trapping segments and at least two gaps. In some embodiments, the lengths of the particle trapping segments account for at least eighty percent of the overall length of the segmented structure.

23 Claims, 12 Drawing Sheets

(56) References Cited

U.S. PATENT DOCUMENTS

| | | | |
|---|---|---|---|
| 8,164,860 B1 | 4/2012 | Ambekar et al. | |
| 8,264,794 B2 | 9/2012 | Hanyu | |
| 8,493,688 B2 | 7/2013 | Ambekar et al. | |
| 8,593,763 B2 * | 11/2013 | Scheppers | G11B 5/6005 360/235.7 |
| 9,190,089 B1 | 11/2015 | Zhang | |
| 9,190,090 B1 | 11/2015 | Zhang et al. | |
| 9,230,587 B1 * | 1/2016 | Hu | G11B 5/6082 |
| 9,449,630 B2 * | 9/2016 | Rajasekharan | G11B 5/4813 |
| 9,911,444 B1 | 3/2018 | Yamane | |
| 9,940,960 B2 * | 4/2018 | Cha | G11B 5/6082 |
| 2003/0169535 A1 | 9/2003 | Boutaghou | |
| 2005/0099932 A1 * | 5/2005 | Yanagisawa | G11B 7/122 369/112.01 |
| 2005/0213252 A1 | 9/2005 | Park | |
| 2007/0206326 A1 | 9/2007 | Zhang | |
| 2010/0103560 A1 * | 4/2010 | Imamura | G11B 5/6005 360/234.3 |
| 2010/0149693 A1 * | 6/2010 | Ooeda | G11B 5/6005 360/246.2 |
| 2010/0202085 A1 * | 8/2010 | Ishii | G11B 5/40 360/110 |
| 2011/0195275 A1 | 8/2011 | Huha et al. | |
| 2012/0050918 A1 | 3/2012 | Ambekar et al. | |
| 2012/0229933 A1 * | 9/2012 | Ma | G11B 5/6082 360/234.1 |

\* cited by examiner

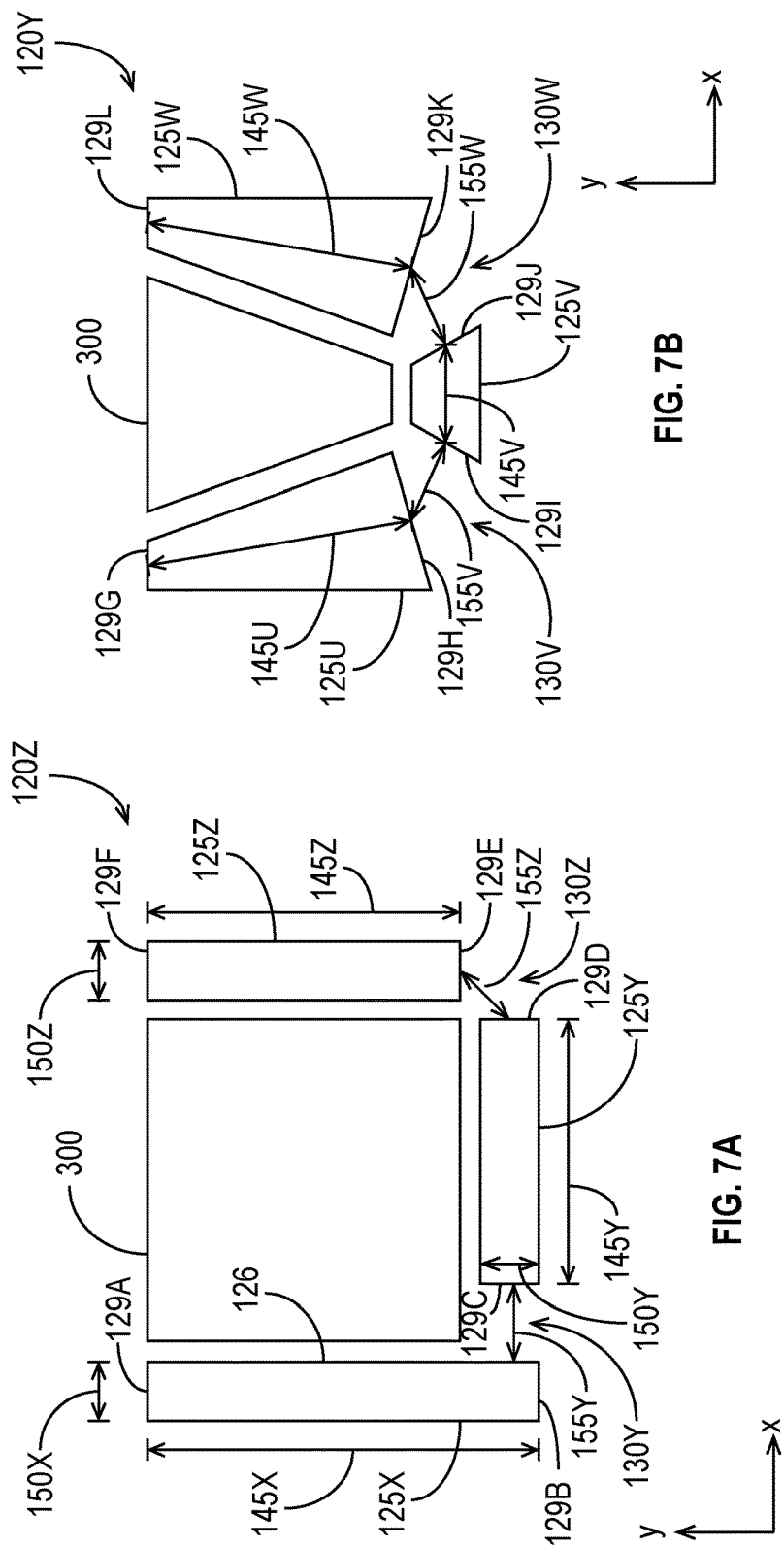

SLIDER AIR-BEARING SURFACE DESIGNS WITH SEGMENTED PARTICLE-TRAPPING STRUCTURES

CROSS-REFERENCE TO RELATED APPLICATIONS

This application is being filed on the same day as, and hereby incorporates by reference for all purposes the entirety of, U.S. patent application Ser. No. 15/908,711, entitled "SLIDER AIR-BEARING SURFACE DESIGNS WITH SIDE PARTICLE-TRAPPING STRUCTURES," and having inventors Yong Hu and Weidong Huang.

BACKGROUND

Data storage systems are used to store large amounts of information. A data storage system typically includes a read/write head for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports the head. The slider provides mechanical support for the head and the electrical connections between the head and the rest of the data storage system.

When the data storage system is in operation, the recording medium (e.g., a hard disk in a hard disk drive) rotates at high speeds, and the slider floats a small distance above the recording medium. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface that faces the medium. The air-bearing surface is designed to generate an air-bearing force that counteracts a preload bias that pushes the slider toward the medium. The air-bearing force causes the slider to fly above and out of contact with the medium.

To improve the areal density capacity of a data storage system, it is desirable to reduce the distance between the slider and the recording medium. As the distance between the slider and recording medium decreases, however, the data storage system becomes more susceptible to the effects of contaminants, such as particulate matter and/or lubricant droplets that can become trapped between the air-bearing surface and the medium. These and other contaminants, generally referred to herein as particles, can scratch or otherwise damage the medium.

Thus, there is an ongoing need for slider designs that improve robustness to particles.

SUMMARY

Disclosed herein are novel slider designs and data storage devices comprising sliders embodying the novel designs. The new designs improve particle robustness while maintaining adequate pitch stiffness.

In some embodiments, a slider comprises a vertical structure (e.g., a leading pad, a side pad, etc.) and a segmented structure adjacent to (i.e., at least nearby but not necessarily in contact with) the vertical structure. The vertical structure extends from a first level of the air-bearing surface (ABS) of the slider to a second level of the ABS such that, when the ABS is oriented upward, the second level is above the first level (i.e., the second level is closer to the recording medium when the slider is installed in a data storage device). In some embodiments, the segmented structure comprises three particle-trapping segments (namely, at least a first particle-trapping segment, a second particle-trapping segment, and a third particle-trapping segment) and two gaps (namely, a first gap between the first particle-trapping segment and the second particle-trapping segment, and a second gap between the second particle-trapping segment and the third particle-trapping segment). When the ABS is oriented upward, the floor of each of the particle-trapping segments is below the first level, and each of the gaps is at a respective level that is at or below the first level. Similarly, the level of each gap is above both floors of the two particle-trapping segments closest to that gap.

In some embodiments, the floors of the particle-trapping segments are at substantially identical levels. In some embodiments, at least one of the particle-trapping segments has a substantially flat floor. In some embodiments, at least one of the particle-trapping segments has a smooth floor. In some embodiments, at least one of the particle-trapping segments has a floor that includes a slope. In some embodiments, at least one of the particle-trapping segments has a non-uniform floor.

In some embodiments, the floors of the different particle-trapping segments are at different levels (e.g., the different particle-trapping segments extend to different depths). In some embodiments, the floors of at least two of the particle-trapping segments extend to different levels. In some embodiments, the different levels of the different particle-trapping segments may have different characteristics (e.g., at least one particle-trapping segment may be flat, smooth, sloped, irregular, non-uniform, etc., and another particle-trapping segment may be not substantially flat, not smooth, not sloped, regular, uniform, etc.).

In some embodiments, the levels of the gaps are substantially the same (e.g., at the first level or at a level below the first level). In some embodiments, different gaps are at different levels.

In some embodiments, the aggregate length of the particle-trapping segments is at least eighty percent of the overall length of the segmented structure.

In some embodiments, the segmented structure is between a leading edge of the slider and the vertical structure.

In some embodiments, the transition from the floor of a particle-trapping segment to the level of the gap bordering the particle-trapping segment is substantially a step (i.e., vertical) for at least one of the particle-trapping segments. In some embodiments, the transition from the floor of a particle-trapping segment to the level of the gap bordering the particle-trapping segment includes a slope (i.e., is not substantially vertical) for at least one of the particle-trapping segments.

In some embodiments, all of the particle-trapping segments abut the vertical structure.

In some embodiments, the segmented structure comprises at least a first particle-trapping segment, a second particle-trapping segment, and a gap disposed between the first and second particle-trapping segments, and the length of the gap is less than twenty percent of the overall length of the segmented structure. When the ABS is oriented upward, the floors of the first and second particle-trapping segments are both below the first level, and the gap is at a level that is at or below the first level and above the floors of both the first and second particle-trapping structures.

In some embodiments, the floors of the first and second particle-trapping structures are substantially identical. In some embodiments, the floor of the first and/or second particle-trapping structure is substantially flat. In some embodiments, the floor of the first and/or second particle-trapping structure is non-uniform. In some embodiments, the floor of the first and/or second particle-trapping structure is smooth.

In some embodiments, the floors of the first and second particle-trapping structures extend to different levels below the first level. In some embodiments, the floor of the first and/or second particle-trapping structure is not substantially flat (i.e., it is sloped, irregular, etc.).

In some embodiments, the transition from the floor of a particle-trapping segment to the level of the gap bordering the particle-trapping segment is substantially a step (i.e., vertical) for at least one of the particle-trapping segments. In some embodiments, the transition from the floor of a particle-trapping segment to the level of the gap bordering the particle-trapping segment includes a slope (i.e., is not substantially vertical) for at least one of the particle-trapping segments.

In some embodiments, both of the particle-trapping segments and the gap abut the vertical structure.

In some embodiments, the segmented structure further comprises a third particle-trapping segment and a second gap between the second particle-trapping segment and the third particle-trapping segment. In some such embodiments, the floor of the third particle-trapping segment is below the first level, the level of the second gap is at or below the first level, and the level of the second gap is above the floor of the second particle-trapping segment and the floor of the third particle-trapping segment.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 7A illustrates an exemplary segmented structure in accordance with some embodiments.

FIG. 7B illustrates an exemplary segmented structure in accordance with some embodiments.

DETAILED DESCRIPTION

The following description is made for the purpose of illustrating the general principles of the present disclosure and is not meant to limit the inventive concepts claimed herein. Furthermore, particular embodiments and/or features described herein may be used in combination with other described embodiments and/or features in various possible combinations and permutations.

Figure 1:
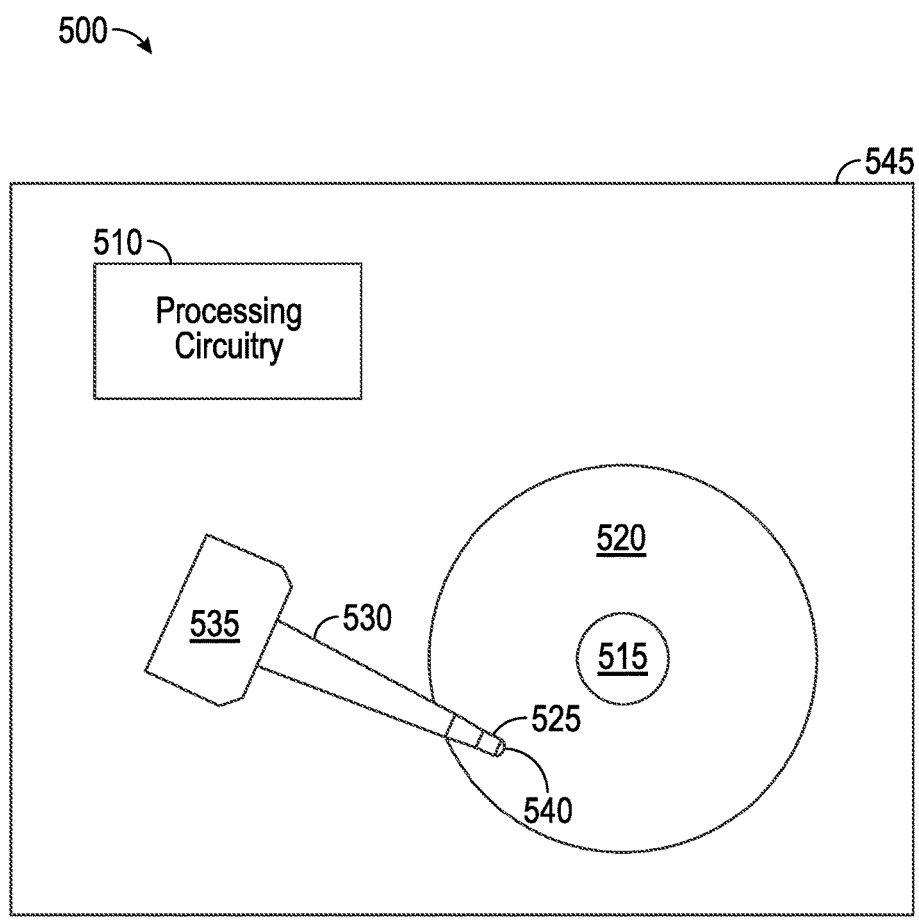
FIG. 1 illustrates several components of an exemplary data storage device that may incorporate various of the disclosed embodiments.

FIG. 1 illustrates several components of an exemplary data storage device, namely a magnetic hard disk drive 500, which may include some of the embodiments disclosed herein. The hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, has a combined read and write magnetic head 540. The head 540 may include only one read sensor, or it may include multiple read sensors. The read sensors in the head 540 may include, for example, one or more giant magnetoresistance (GMR) sensors, tunneling magnetoresistance (TMR) sensors, or another type of magnetoresistive sensor. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, the hard disk drive 500 may include a plurality (i.e., more than one) of disks 520, sliders 525, heads 540, and suspension and actuator arms 530.

In operation, the actuator 535 moves the suspension and actuator arm 530 to position the slider 525 so that the magnetic head 540 is in a transducing relationship with the surface of the magnetic disk 520. When the spindle motor rotates the disk 520, the slider 525 is supported on a thin cushion of air known as the air bearing that exists between the surface of the disk 520 and an air-bearing surface of the slider 525.

The head 540 may be used to write information to multiple tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks. To read information from the magnetic disk 520, the slider 525 passes over a region of the disk 520, and the head 540 detects changes in resistance due to magnetic field variations recorded on the disk 520, which represent the recorded bits.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium in a sealed helium hard disk drive 500). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520.

To obtain good performance, it is desirable for the slider 525 to maintain a substantially constant flying height above the surface of the disk 520. The degree of stability of the fly-height of the slider 525 influences the performance of the magnetic head 540. The design of the slider 525 ABS has an impact on the flying characteristics of the slider 525 and therefore the performance of the magnetic head 540.

Figure 2:
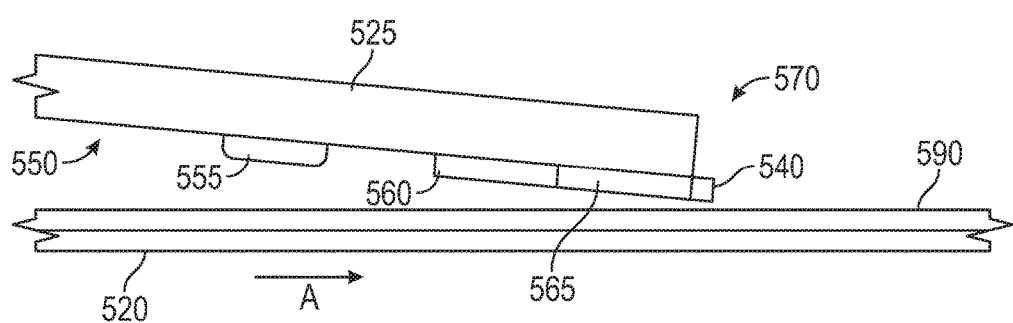
FIG. 2 is a side view of the slider and the magnetic disk of FIG. 1.

FIG. 2 is a side view of the slider 525 and the magnetic disk 520 of FIG. 1. The slider 525 may be in accordance with one or more of the embodiments disclosed herein. The magnetic disk 520 is moving in the direction of arrow A and causes airflow in the same direction. This airflow flows over the ABS 550 of the slider 525 and produces the lifting pressure described above. In some embodiments, the slider 525 includes raised areas such as a front pad 555, one or more side pads 560, and a trailing pad 565. The trailing pad 565, located adjacent to the trailing edge 570 of the slider 525, may further include the magnetic read/write head 540 that writes data to and reads data from the magnetic disk 520. The disk 520 has a lubricant 590 on its upper surface to protect the recording layer of the disk 520 from contact with the slider 525 and/or other components of the disk drive 500.

Figure 3:
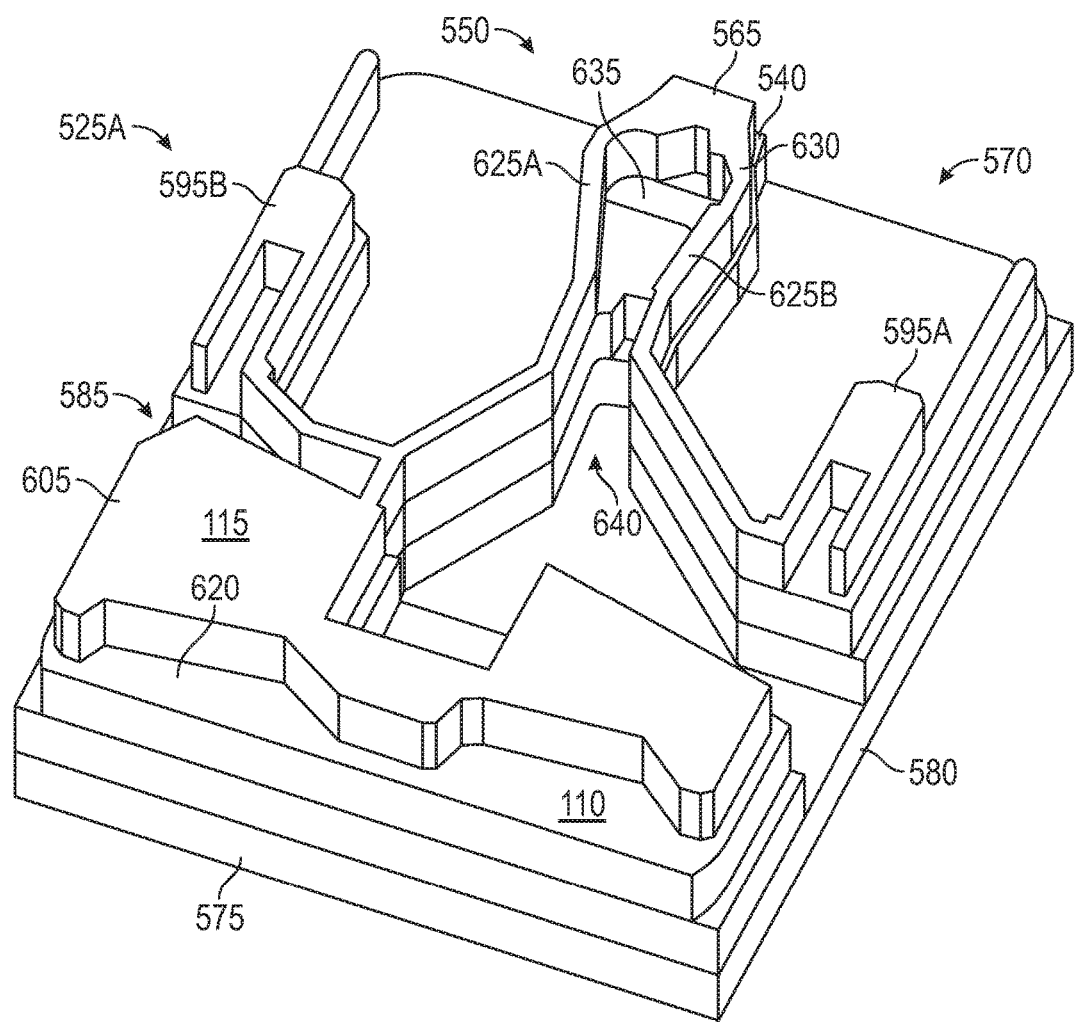
FIG. 3 is a perspective view of a conventional slider, illustrating the air-bearing surface.

FIG. 3 is a perspective view of the ABS 550 of a conventional slider 525A. The slider 525A has a leading edge 575, a trailing edge 570, a first side edge 580, a second side edge 585, and an ABS 550. A trailing pad 565 is adjacent to the trailing edge 570 of the slider 525A and, as shown, is substantially centered relative to the trailing edge 570. The first and second side pads 595A, 595B are adjacent, respectively, to the first second side edges 580, 585 of the slider 525A. As illustrated in FIG. 3, each of the first and second side pads 595A and 595B may have a substantially "U" shaped configuration, with the open part of the U facing the leading edge 575 of the slider 525A. Typically, the trailing pad 565 has a read/write head 540 mounted thereon, on the rear portion of the trailing pad 565 adjacent to the trailing edge 570 of the slider 525A.

As shown in FIG. 3, the ABS 550 also has a first leading pad 605 near the leading edge 575 of the slider 525A. The portion of the first leading pad 605 that is closest to the disk 520 when the slider 525A is installed in a hard disk drive 500 is at a level 115. The first leading pad 605 intersects a second leading pad 620 disposed between the first leading pad 605 and the leading edge 575 of the slider 525A. The portion of the second leading pad 620 that is closest to the disk 520 when the slider 525A is installed in a hard disk drive 500 is at a level 110. The second leading pad 620 is in contact with the base of the first leading pad 605.

The ABS 550 of the slider 525A in FIG. 3 also includes first and second arms 625A, 625B, which are connected to the sides of the trailing pad 565 and extend toward the leading edge 575 of the slider 525A. The trailing pad 565, the first arm 625A, and the second arm 625B together form a tail section 630 of the trailing portion 635 of the slider 525A. A longitudinal channel 640 is between the first and second arms 625A, 625B. In the example slider 525A of FIG. 3, the first and second arms 625A, 625B connect the first 595A and second 595B side pads, respectively, to the trailing pad 565. The portions of the first and second arms 625A, 625B closest to the trailing pad 565 extend toward the leading edge 575 of the slider 525A. As the first and second arms 625A, 625B extend further from the trailing pad 565, the first and second arms 625A, 625B form an arc toward the first side edge 580 and the second side edge 585 of the slider 525A and connect to the inner top portion of the U-shaped side pads 595A and 595B, respectively.

In hard disk drives, particles tend to build up at the leading edge surface of the slider 525, particularly in areas close to the step to the surface 115 (e.g., level 110 of the second leading pad 620). These particles may touch the disk 520, which can result in damage to the disk 520. Some types of particles (e.g., harder particles such as diamond, alumina, TiC, etc.) are likely to scratch the disk 520 if they touch it. Other types of particles (e.g., softer particles such as silicon, stainless steel, lubricant 590, etc.) are less likely to cause detectable physical damage to the disk 520, but they can still cause recorded magnetic information to be erased because of thermal and/or mechanical stress.

Particle build-up can be a significant problem for both hard disk drives that operate in air and disk drives that operate in lower-pressure-environments, such as sealed helium drives. The problem can be particularly acute for lower-pressure-environment disk drives. For example, in sealed helium hard disk drives, there is significantly less pressure gradient at the slider's trailing edge, which causes little-to-no backflow at the trailing edge. The lower pressure gradient causes particles to be less mobile, which can lead to particle build-up. Consequently, it is desirable to mitigate the deleterious effects of particles in magnetic storage devices.

Figure 4:
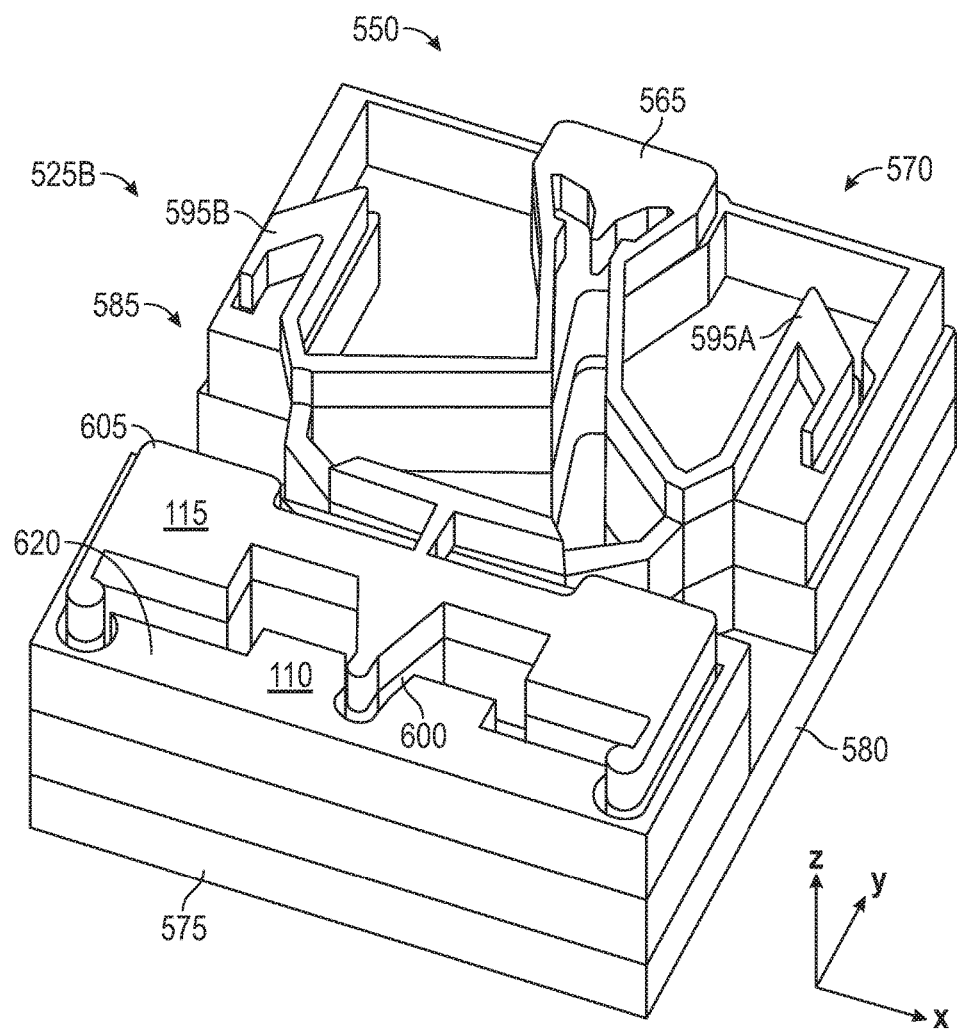
FIG. 4 illustrates a slider with a continuous particle-trapping hole near the leading edge.

U.S. Pat. No. 9,230,587, the entirety of which is hereby incorporated by reference for all purposes, discloses a continuous particle-trapping hole to collect particles that might otherwise damage the disk 520 or adversely affect the performance of a magnetic storage device. FIG. 4 illustrates a slider 525B with a continuous particle-trapping hole 600 disposed at the base of the first leading pad 605 and between the first leading pad 605 and the second leading pad 620. This design significantly improves particle robustness but may reduce the slider 525B pitch stiffness by reducing gas pressurization at the leading edge 575 of the slider 525B. The reduced gas pressurization may be problematic in some data storage devices, such as those operating in lower-pressure conditions. What is needed is a slider 525 that provides some or all of the benefits of the continuous particle-trapping hole 600 shown in FIG. 4 while providing sufficient gas pressurization at the leading edge 575 of the slider 525B.

Disclosed herein are slider designs with segmented particle-trapping structures comprising multiple (i.e., at least two) particle-trapping segments, where each pair of adjacent particle-trapping segments is separated by a gap. In some environments, such as, for example, sealed helium hard disk drives, the gap(s) can improve air compression while the particle-trapping segments provide high particle robustness. The number of particle-trapping segments, and the sizes, shapes, and characteristics of the particle-trapping segments, and the size(s) and characteristics of the gap(s) between adjacent particle-trapping segments can all be adjusted and/or optimized to achieve a desired trade-off between pitch stiffness and particle robustness for a particular operating environment, a set of operating environments, or a range of operating conditions.

In some embodiments, a segmented structure 120 is disposed at or near the base of a vertical structure of a slider 525 and generally follows at least a portion of the base of the vertical structure. The segmented structure 120 is said to be adjacent to the vertical structure because each of its component parts (particle-trapping segments and gaps) is located proximate to, but is not necessarily touching (i.e., abutting), the base of the vertical structure, and its shape when viewed from above (i.e., in the x-y plane) generally follows the shape of at least a portion of the base. It is to be understood that the reference number "120" by itself is used herein to refer generally to segmented structures. Specific exemplary segmented structures are given the reference number 120 followed by a letter.

Figure 5:
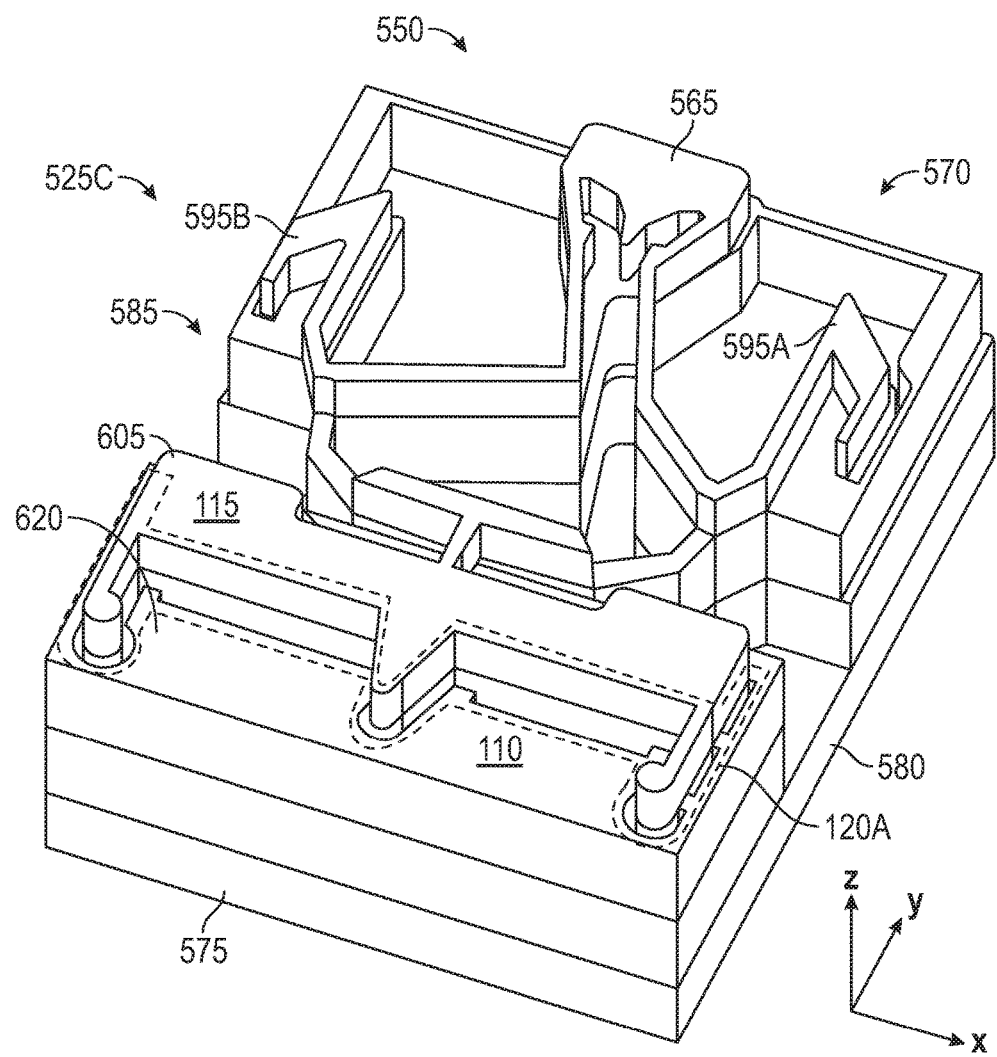
FIG. 5 is a perspective view of a slider with an exemplary segmented structure in accordance with some embodiments.
Figure 6A:
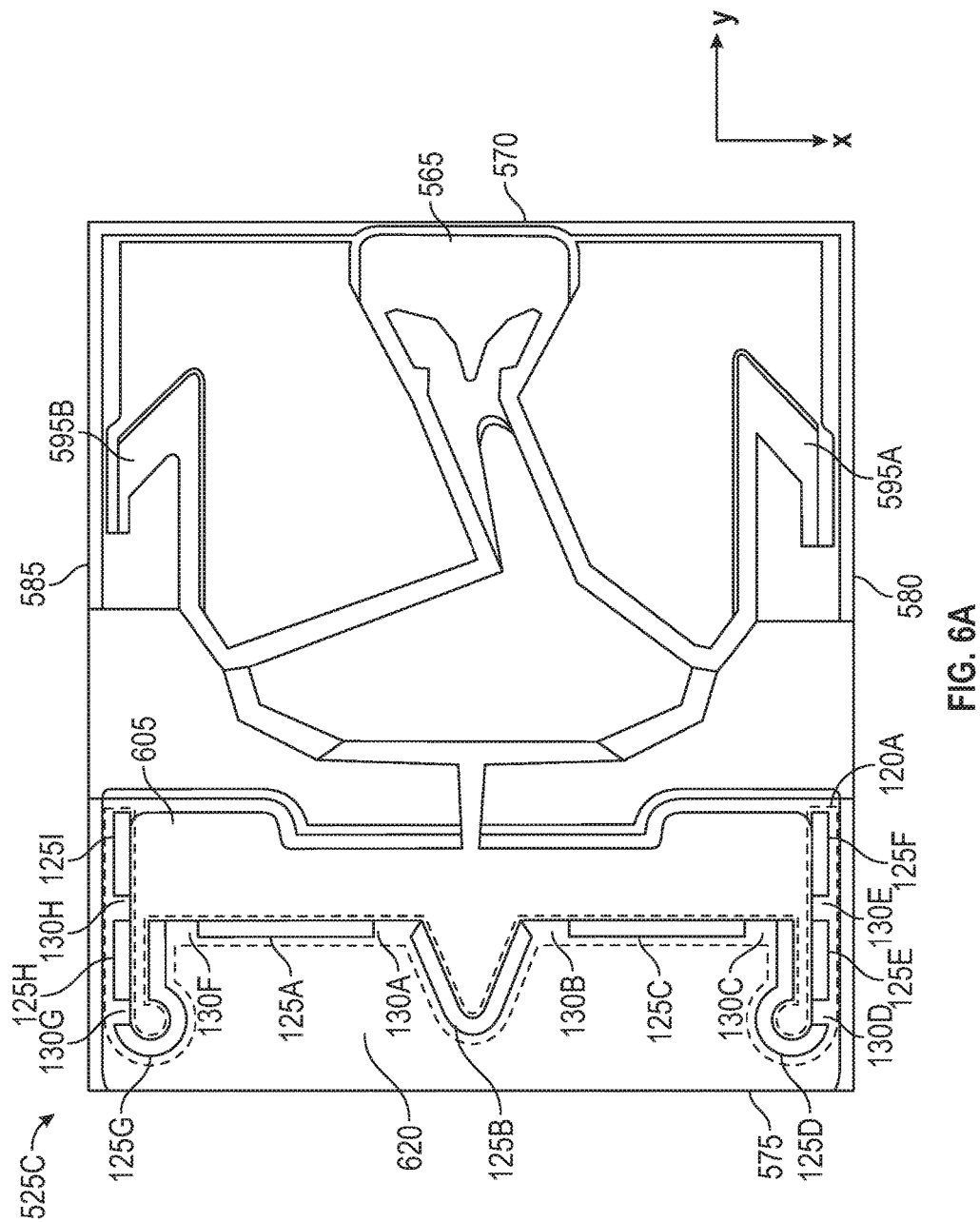
FIG. 6A is a top view of the ABS of the slider illustrated in FIG. 5.
Figure 6B:
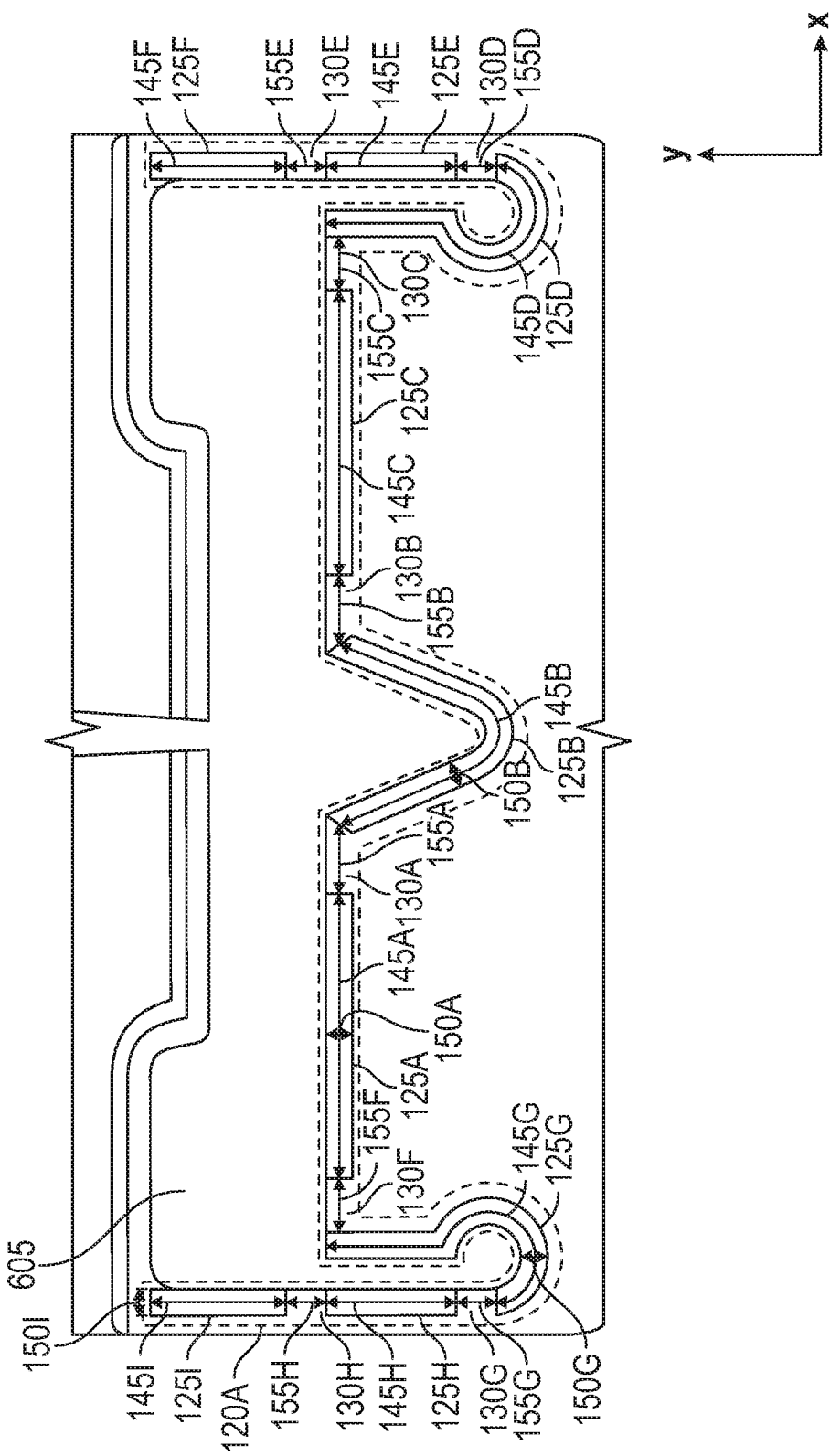
FIG. 6B illustrates the segmented structure of FIGS. 5 and 6A.

FIGS. 5 and 6A illustrate an exemplary slider 525C that includes an exemplary segmented structure 120A in accordance with some embodiments, and FIG. 6B provides a closer view of the exemplary segmented structure 120A. FIG. 5 is a perspective view of the slider 525C, and FIG. 6A is a top view of the ABS 550 of the slider 525C (i.e., a view along the z-axis shown in FIG. 5). The first leading pad 605 is an example of what is referred to herein as a vertical structure because when the slider 525C is oriented with the ABS 550 upward, as shown in FIG. 5, the first leading pad 605 extends upward (i.e., substantially vertically, in the z-direction) from the second leading pad 620. In other words, the first leading pad 605 extends from a first level 110 of the ABS 550 to a second level 115 of the ABS 550, where the second level 115 is above the first level 110 when the slider 525C is oriented with the ABS 550 upward (as illustrated in FIG. 5). Likewise, the first and second side pads 595A, 595B are also examples of vertical structures.

Although FIG. 5 illustrates an abrupt (i.e., step-function-like) transition from the first level 110 to the second level 115, it is to be understood that the transition from the first level 110 to the second level 115 need not be as abrupt as shown. In other words, the walls of the first leading pad 605 need not be substantially vertical when the ABS 550 faces upward. In some embodiments, the walls of the first leading pad 605 are substantially perpendicular to the surface of the second leading pad 620 (at the level 110), but in other embodiments, the transition from the level 110 (the second leading edge pad 620) to the level 115 (the top of the first leading pad 605) has a gentler slope.

In the exemplary embodiment of FIGS. 5, 6A, and 6B, the segmented structure 120A is next to the base of the leading pad 605 and has a path that follows a portion of the base of the leading pad 605 (namely, portions of the leading pad 605 that face the leading edge 575 and the side edges 580, 585). Therefore, the segmented structure 120A is adjacent to the leading pad 605 (a vertical structure).

In general, a segmented structure 120 may be touching the base of whatever vertical structure it follows, or it may be offset from the base of the vertical structure. Either way, it is said to be adjacent to the base of the vertical structure. In the exemplary embodiment of FIGS. 5, 6A, and 6B, the segmented structure 120A is touching the base of the leading pad 605.

A segmented structure 120 comprises a plurality of (i.e., at least two) particle-trapping segments 125 and at least one gap 130. Each gap 130 is disposed between two adjacent particle-trapping segments 125. In other words, each pair of adjacent particle-trapping segments 125 is separated by a gap 130. In the embodiment illustrated in FIGS. 5, 6A, and 6B, the segmented structure 120A includes nine particle-trapping segments 125, which are labeled in FIGS. 6A and 6B as 125A through 125I, and eight gaps 130, which are labeled in FIGS. 6A and 6B as 130A through 130H. The gap 130A is disposed between the particle-trapping segments 125A and 125B, the gap 130B is disposed between the particle-trapping segments 125B and 125C, etc. In the embodiment shown in FIGS. 5, 6A, and 6B, when viewed in the x-y plane, from above the ABS 550, the segmented structure 120A has an appearance evocative of a dashed line. In other embodiments, the segmented structure 120 does not resemble a dashed line quite as closely as the segmented structure 120A of FIGS. 5, 6A, and 6B (see, e.g., FIG. 7B), but the segmented structure 120 still includes at least two particle-trapping segments 125 and a gap 130 disposed between each adjacent pair of particle-trapping segments 125.

It is to be understood that different component parts (i.e., particle-trapping segments 125 and gaps 130) of a segmented structure 120 may be disposed differently relative to the base of the vertical structure. For example, a first particle-trapping segment 125 may be touching the base of the vertical structure, whereas a second particle-trapping segment 125 may be offset from the base of the vertical structure. As long as each particle-trapping segment 125 and each gap 130 is located proximate to, but is not necessarily touching, the base of the vertical structure, and the path of the segmented structure 120 in the x-y plane generally follows the shape of at least a portion of the base, the segmented structure 120 is adjacent to the vertical structure.

Each particle-trapping segment 125 is characterized by a respective length 145, and each gap 130 is characterized by a respective length 155. A segmented structure 120 has an overall length that is the sum of the lengths 145 of all particle-trapping segments 125 and the lengths 155 of all gaps 130 in the segmented structure 120. For a segmented structure 120 that has N particle-trapping segments 125 and N−1 gaps 130, the overall length $L_{SS}$ of the segmented structure 120 can be written as $$L_{SS} = \sum_{i=1}^{N} L_{PTS}(i) + \sum_{i=1}^{N-1} L_G(i)$$

where $L_{PTS}(i)$ is the length 145 of the ith particle-trapping segment 125, $L_G(i)$ is the length 155 of the ith gap 130, and N is the number of particle-trapping segments 125 in the segmented structure 120. In some embodiments, the sum of the lengths 145 of all particle-trapping segments 125 (i.e., the component $$\sum_{i=1}^{N} L_{PTS}(i)$$

of the equation above) is at least eighty percent of the overall length of the segmented structure 120. In other words, $$\sum_{i=1}^{N} L_{PTS}(i) \geq 0.8 \times L_{SS}$$

(or, equivalently, $$\sum_{i=1}^{N-1} L_G(i) < 0.2 \times L_{SS}\Bigg).$$

To illustrate how the lengths 145 of the individual particle-trapping segments 125 and the lengths 155 of the individual gaps 130 are determined, FIG. 7A illustrates a simple segmented structure 120Z in the x-y plane. In the exemplary embodiment of FIG. 7A, the vertical structure 300 has a substantially rectangular footprint in the x-y plane. The exemplary segmented structure 120Z of FIG. 7A has three particle-trapping segments 125X, 125Y, and 125Z and two gaps 130Y and 130Z. Specifically, the gap 130Y is disposed between the particle-trapping segments 125X and 125Y, and the gap 130Z is disposed between the particle-trapping segments 125Y and 125Z.

When a particle-trapping segment 125 has a quadrilateral shape, such as in the examples shown in FIGS. 6A, 6B, 7A, and 7B, the length 145 of the particle-trapping segment 125 is the distance from the midpoint of one end 129 of the particle-trapping segment 125 to the midpoint of the other end 129 of the particle-trapping segment 125 in the direction that is roughly along the portion of the base of the vertical structure 300 adjacent to the particle-trapping segment 125. For example, FIG. 7A shows an exemplary segmented structure 120Z in which the particle-trapping segments 125X, 125Y, and 125Z all have quadrilateral shapes. Because all of the particle-trapping segments 125X, 125Y, and 125Z in FIG. 7A are substantially rectangular, the distance from the midpoint of one end 129 of a particle-trapping segment 125 to the midpoint of the other end 129 of the particle-trapping segment 125 in the same general direction as the base of the vertical structure 300 is simply the distance from one end 129 to the other end 129. For example, the length 145X of the particle-trapping segment 125X is the distance from the end 129A to the end 129B. Similarly, the length 145Y of the particle-trapping segment 125Y is the distance from the end 129C to the end 129D, and the length 145Z of the particle-trapping segment 125Z is the distance from the end 129E to the end 129F.

The length 155 of a gap 130 of a segmented structure 120 depends on how the adjacent particle-trapping segments 125 that define the gap 130 are positioned relative to each other. A gap 130 may be positioned between the ends 129 of two adjacent particle-trapping segments 125, or between the end 129 of one particle-trapping segment 125 and the side 126 of the adjacent particle-trapping segment 125. When a gap 130 is disposed between and defined by the ends 129 of two adjacent particle-trapping segments 125, the length 155 of the gap 130 is the distance between the midpoints of the ends 129 of the adjacent particle-trapping segments 125. For example, in FIG. 7A, the end 129E of the particle-trapping segment 125Z faces the end 129D of the particle-trapping segment 125Y, and the gap 130Z is between the ends 129D and 129E. The length 155Z of the gap 130Z is, therefore, the distance between the midpoints of the ends 129D and 129E of particle-trapping segments 125Y and 125Z, as shown in FIG. 7A.

When a gap 130 is between and defined by the end 129 of a first particle-trapping segment 125 and the side 126 of a second particle-trapping segment 125, the length 155 of the gap 130 is the length of the shortest path between the midpoint of the end 129 of the first particle-trapping segment 125 and the side 126 of the second particle-trapping segment 125. For example, in FIG. 7A, the gap 130Y is defined by and disposed between a side 126 of the particle-trapping segment 125X and the end 129C of the particle-trapping segment 125Y. Thus, the length 155Y of the gap 130Y is the length of the shortest path between midpoint of the end 129C of the particle-trapping segment 125Y and the side 126 of the particle-trapping segment 125X. As shown, in the example of FIG. 7A, the shortest path is perpendicular to the end 129C of the particle-trapping segment 125Y.

The particle-trapping segments 125 may have any suitable shape (also referred to as a footprint) in the x-y plane. In the exemplary embodiment shown in FIG. 7A, each of the particle-trapping segments 125 is substantially rectangular in the x-y plane. In other embodiments, some or all of the particle-trapping segments 125 are not rectangular (e.g., they may have different quadrilateral or other shapes and/or may be irregular). FIG. 7B provides an example of a segmented structure 120Y that has non-rectangular, but quadrilateral, particle-trapping segments 125. In this example, the vertical structure 300 has a trapezoidal footprint in the x-y plane. The gaps 130V and 130W are defined by and disposed between the ends 129 of the adjacent particle-trapping segments 125. The lengths 145U, 145V, 145W of the particle-trapping segments 125U, 125V, 125V and the lengths 155V, 155W of the gaps 130V, 130W may be determined as described above. Specifically, and as shown in FIG. 7B, the length 145U of the particle-trapping segment 125U is the distance between the midpoint of the end 129G and the midpoint of the end 129H, the length 145V of the particle-trapping segment 125V is the distance between the midpoint of the end 129I and the midpoint of the end 129J, and the length 145W of the particle-trapping segment 125W is the distance between the midpoint of the end 129K and the midpoint of the end 129L. Similarly, the length 155V of the gap 130V is the distance between midpoint of the end 129H of the particle-trapping segment 125U and the and the midpoint of the end 129I of the particle-trapping segment 125V, and the length 155W of the gap 130W is the distance between the midpoint of the end 129J of the particle-trapping segment 125V and the midpoint of the end 129K of the particle-trapping segment 125W.

Figure 7C:
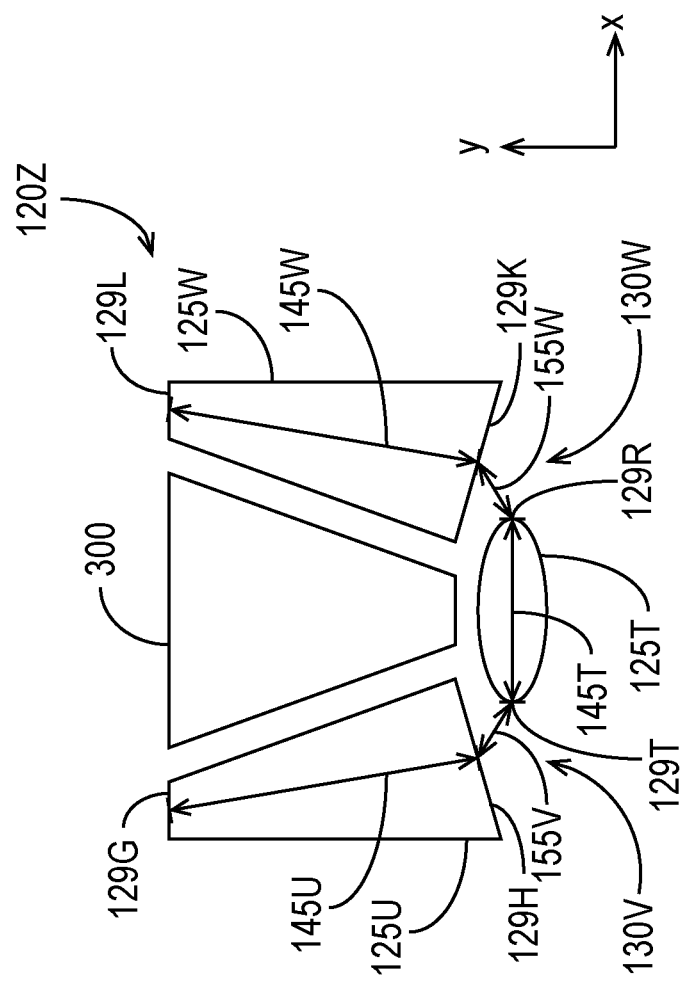
FIG. 7C illustrates an exemplary segmented structure in accordance with some embodiments.

It is to be understood that the particle-trapping segments 125 need not have quadrilateral footprints in the x-y plane. In some embodiments, a particle-trapping segment 125 has a non-quadrilateral shape (e.g., elliptical, oval, hexagonal, irregular, etc.) in the x-y plane. In such embodiments, the length 145 may be defined as the average length, the maximum length, or in another suitable way that will be readily identifiable by a skilled artisan given the shape of the particle-trapping segment 125 in the x-y plane. As one example, FIG. 7C illustrates an exemplary embodiment in which the segmented structure 120Z is similar to the segmented structure 120Y of FIG. 7B, but in place of the quadrilateral-shaped particle-trapping segment 125V, the segmented structure 120Z includes a particle-trapping segment 125T with an elliptical footprint in the x-y plane. Unlike quadrilaterals, ellipses do not have sides. But, as skilled artisans understand, ellipses have major and minor axes (where the major axis is longer than the minor axis). Depending on the orientation of an elliptically-shaped particle-trapping segment 125, the length 145 may be defined, for example, as the length of the major or minor axis. For example, as shown in FIG. 7C, the length 145T of the particle-trapping segment 125T is the length of the major axis, which extends between the point 129T and the point 129R. Skilled artisans will understand, based on the disclosures herein, how to define the lengths 145 of particle-trapping segments 125 having other shapes in the x-y plane than those specifically described herein.

Every particle-trapping segment 125 has a respective length 145, even if the path characterizing the length 145 (e.g., the path connecting the midpoint of one end 129 to the other end 129) is not a straight line in the x-y plane. For example, the particle-trapping segments 125B, 125D, and 125G of FIGS. 6A and 6B include curved boundaries in the x-y plane, but, as shown in FIG. 6B, each particle-trapping segment 125B, 125D, and 125G still has a respective length 145. Specifically, the particle-trapping segment 125B has a length 145B, the particle-trapping segment 125D has a length 145D, and the particle-trapping segment 125G has a length 145G. As shown in FIG. 6B, each of the lengths 145B, 145D, and 145G can be determined, respectively, as the distance of a path in the x-y plane that runs through the particle-trapping segment 125B, 125D, and 125D, between and intersecting the midpoints of the ends 129 of the particle-trapping segment 125B, 125D, or 125G. For a particle-trapping segment 125 having a substantially uniform width, the length 145 may be determined as the length of the path that connects the midpoints of the ends 129 of the particle-trapping segment 125 and runs through the center of the particle-trapping segment 125.

As illustrated in FIG. 7A, in embodiments with rectangular particle-trapping segments 125 (and potentially in embodiments with other regularly-shaped particle trapping segments 125, as will be understood by skilled artisans in view of the disclosures herein), each rectangular-shaped particle-trapping segment 125 has a width 150 in addition to a length 145. For example, as shown in FIG. 7A, the particle-trapping segment 125X has a width 150X, the particle-trapping segment 125Y has a width 150Y, and the particle-trapping segment 125Z has a width 150Z.

Similarly, each particle-trapping segment 125 that is uniformly wide (as are all particle-trapping segments 125A through 125I in the embodiment illustrated in FIGS. 6A and 6B) has a width 150. FIG. 6B illustrates a few of the widths 150 of the particle-trapping segments 125 of the segmented structure 120A. To avoid overcrowding the drawings, only the widths 150A, 150B, 150G, and 150I are shown for, respectively, the particle-trapping segments 125A, 125B, 125G, and 125I. The width 150 of a particle-trapping segment 125 is the distance, in the x-y plane, between a first point on the edge of the particle-trapping segment 125 that is closest to the vertical structure and a second point on the opposite edge of the particle-trapping segment 125 that, if connected by a line to the first point, results in the line being perpendicular to the base of the vertical structure.

FIG. 6B illustrates all of the particle-trapping segments 125 having substantially uniform widths 150 (i.e., the width 150 is substantially the same regardless of the selected location of the first point). In some embodiments, a particle-trapping segment 125 has a different shape with a non-uniform width along the length 145 of the particle-trapping segment 125 (e.g., in the x-y plane, the particle-trapping segment 125 is elliptical, oval, hexagonal, irregularly-shaped, etc.). For example, the particle-trapping segments 125U, 125V, and 125W of FIG. 7B, and the particle-trapping segments 125U, 125T, and 125W of FIG. 7C have non-uniform widths 150 (i.e., the width 150 varies along the length 145). In such embodiments, and as will be understood by skilled artisans, the width 150 may be defined as the average width, the maximum width, or in another suitable way given the shape of the particle-trapping segment 125 in the x-y plane.

FIG. 6B also illustrates all of the particle-trapping segments 125 all having substantially identical widths 150. In some embodiments, the widths 150 of different particle-trapping segments 125 differ. As will be appreciated by skilled artisans, along with the other characteristics of particle-trapping segments 125, the widths 150 may be adjusted to imbue the slider 525 with the desired combination of pitch stiffness and particle robustness.

As also shown in FIG. 6B, each of the gaps 130 has a respective length 155. The length 155 of a particular gap 130 may be determined as described above in the context of FIGS. 7A and 7B.

Each particle-trapping segment 125 also has a floor 127. The floor 127, which may be level or sloped, and may be smooth or non-smooth, is characterized by at least one level 135. The level 135 is below the level of the gap 130 (illustrated as the level 110). In some embodiments, at least one particle-trapping segment 125 of a segmented structure 120 also has at least one wall 128 that connects the floor 127 to the adjacent gap 130. In embodiments in which at least one particle-trapping segment 125 also has at least one wall 128, when the ABS 550 is oriented upward as illustrated in FIG. 5, the at least one wall 128 extends downward to the floor 127 of that at least one particle-trapping segment 125. In some embodiments in which at least one particle-trapping segment 125 also has at least one wall 128, the transition from the floor 127 to the gap 130 is substantially a step (i.e., the wall 128 is approximately vertical).

Figure 8A:
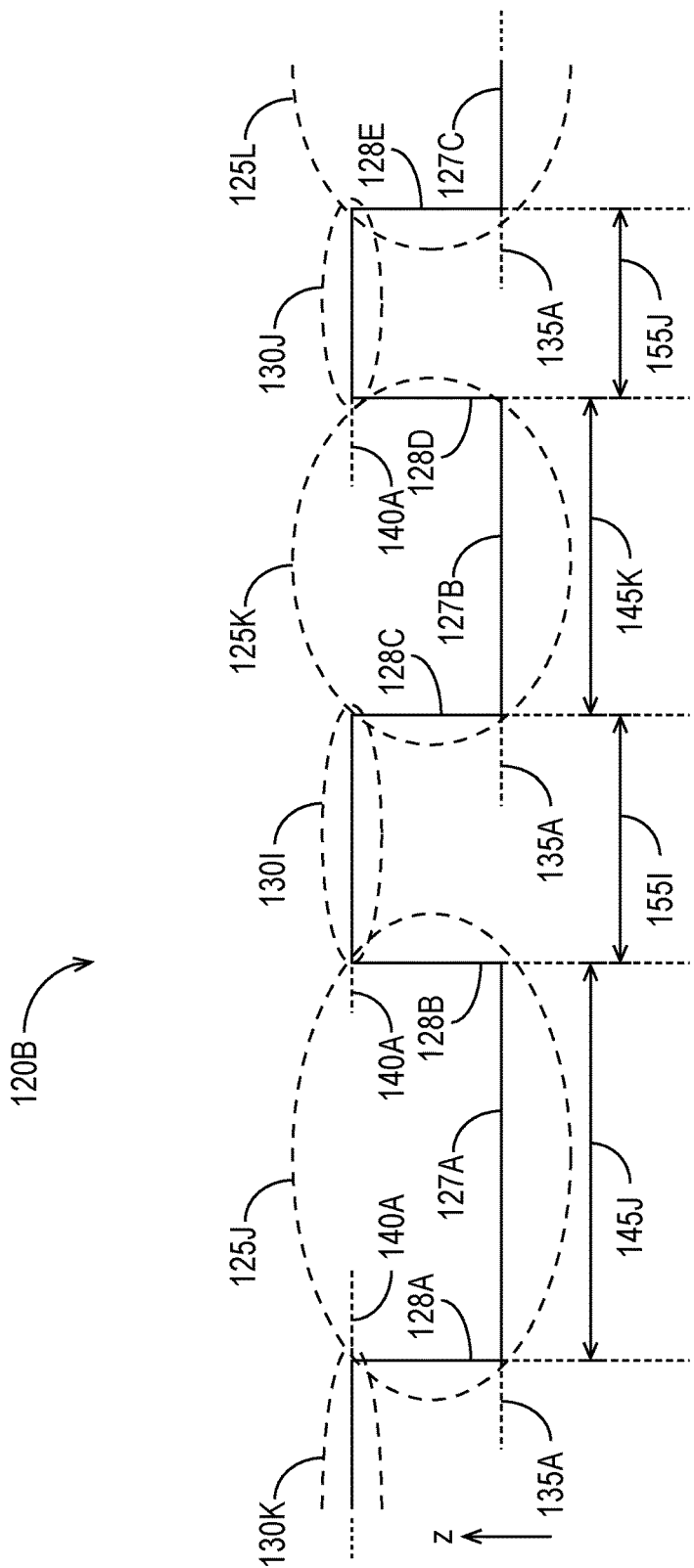
FIG. 8A is an elevation profile of a portion of an exemplary segmented structure in accordance with some embodiments.

FIG. 8A is an elevation profile of a portion of an exemplary segmented structure 120B for purposes of illustrating, among other things, the floors 127 of the particle-trapping segments 125. As shown in FIGS. 5, 6A, 6B, and 7A through 7C, in the x-y plane, a segmented structure 120 follows a path that is generally parallel (i.e., similar in direction but not necessarily identical or exactly parallel, particularly when the shapes of the particle-trapping segments 125 do not have uniform widths 150) to the base of a vertical structure (e.g., the first leading pad 605, a side pad 595, etc.). But neither the entire segmented structure 120 nor the particle-trapping segments 125 are required to run only parallel to the x- or y-axis illustrated in the exemplary embodiments shown in FIGS. 5, 6A, 6B, 7A, 7B, and 7C, or parallel to any single axis in the x-y plane. For example, the path followed by the segmented structure 120A shown in FIGS. 5, 6A, and 6B lies in the x-y plane but is not always parallel to the x-axis, the y-axis, or another axis in the x-y plane. Therefore, the elevation profile of FIG. 8A shows only the direction of the z-axis. It is to be understood that the horizontal axis in FIG. 8A (and other drawings showing elevation profiles) is a concatenation of cross-sections of the segmented structure 120 taken parallel to the z-axis through the x-y plane at the paths used to determine the lengths of the elements of the segmented structure 120. Consequently, FIG. 8A and other elevation profiles provided herein are "flattened" representations of segmented structures 120. In other words, FIG. 8A is a two-dimensional representation of a (not necessarily continuous) cross-section taken along the lengths of the particle-trapping segments 125 and gaps 130 as described above.

It is to be understood that the flattened representation of a segmented structure 120 is conceptual and convenient to explain the characteristics of particle-trapping segments 125 and gaps 130 making up that segmented structure 120, regardless of whether the gaps 130 are defined by and disposed between the ends 129 of two adjacent particle-trapping segments 125 or the end 129 of a first particle-trapping segment 125 and the side 126 of a second particle-trapping segment 125, and regardless of whether the length paths of adjacent particle-trapping segments 125 and gaps 130 intersect to form a contiguous path. In other words, the discussion below is not limited to embodiments in which the gaps 130 are defined by and disposed between the ends 129 of adjacent particle-trapping segments 125.

The exemplary portion of the segmented structure 120B shown in FIG. 8A includes three particle-trapping segments 125J, 125K, and 125L. Only a portion of the particle-trapping segment 125L is illustrated. FIG. 8A also illustrates three gaps 130I, 130J, and 130K. Only a portion of the gap 130K is shown. The gap 130I is between the particle-trapping segments 125J and 125K, and the gap 130J is between the particle-trapping segments 125K and 125L. The particle-trapping segment 125J is between the gaps 130K and 130I.

Each of the one or more gaps 130 is at a respective level 140, which is at or below the level 110 (i.e., the level of the base of the vertical structure). In some embodiments with two or more gaps 130, all of the gaps 130 are at the same level 140, which is at or below the level 110. For example, in the embodiment illustrated in FIGS. 5, 6A, and 6B, each of the gaps 130A, 130B, 130C, 130D, 130E, 130F, 130G, and 130H is at the level 110. As another example, in FIG. 8A, the gaps 130I, 130J, and 130K are all at the same level 140A, which is at or below the level of the base of the vertical structure the segmented structure 120B generally follows.

Figure 8B:
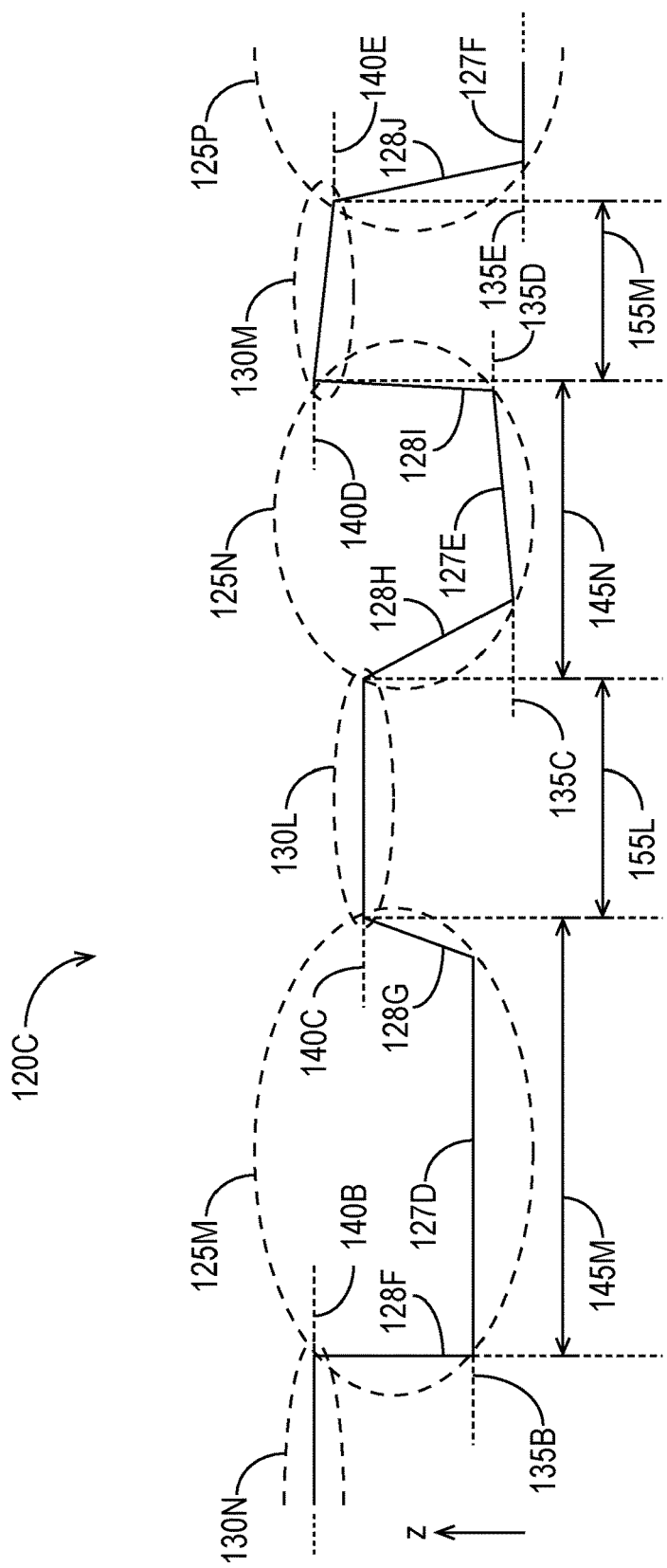
FIG. 8B is an elevation profile of a portion of an exemplary segmented structure in accordance with some embodiments.

In some embodiments, different gaps 130 of a segmented structure 120 are at different levels 140. For example, FIG. 8B illustrates a segmented structure 120C that includes three particle-trapping segments 125M, 125N, and 125P. Only a portion of the particle-trapping segment 125P is illustrated. FIG. 8B also illustrates three gaps 130L, 130M, and 130N. Only a portion of the gap 130N is shown. The gap 130L is between the particle-trapping segments 125M and 125N, and the gap 130M is between the particle-trapping segments 125N and 125P. The particle-trapping segment 125M is between the gaps 130N and 130L. In the exemplary segmented structure 120C, the gap 130L is at a level 140C, the gap 130M is at a level that slopes from 140D to 140E, the gap 130N is at a level 140B, which is above the level 140C. Each of the levels 140B, 140C, 140D, and 140E is at or below the level of the base of the vertical structure the segmented structure 120C generally follows.

In some embodiments, the floors 127 of different particle-trapping segments 125 extend to the same level 135. For example, in the exemplary embodiment shown in FIG. 8A, the floors 127A, 127B, and 127C of the particle-trapping segments 125J, 125K, and 125L of the segmented structure 120B extend to the same level 135A. In some embodiments, the floor 127 of at least one particle-trapping segment 125 extends to a different level 135 than the floor 127 of at least one other particle-trapping segment 125. For example, as shown in FIG. 8B, a segmented structure 120C may include a first particle-trapping segment 125M with a floor 127D that extends to a first level 135B and a second particle-trapping segment 125P with a floor 127F that extends to a second level 135E, where the first and second levels 135B, 135E differ.

Furthermore, the floor 127 of a particular particle-trapping segment 125 may be flat and substantially horizontal, or it may include a slope and/or one or more crevices, protrusions, or other features that result in the floor 127 of the particle-trapping segment 125 having a surface that varies in elevation. For example, the particle-trapping segments 125J, 125K, and 125L in FIG. 8A all have smooth and substantially flat floors 127A, 127B, and 127C. In the example of FIG. 8B, the particle-trapping segment 125M extends to a level 135B, and its floor 127D is flat over the length 145M of the particle-trapping segment 125M. In contrast, the particle-trapping segment 125N has a sloped floor 127E, the entirety of which lies below the level 135B. Specifically, the particle-trapping segment 125N has a floor 127E with a depth that varies across the length 145N of the particle-trapping segment 125N. One end of the floor 127E is at a level 135C, and the other end of the floor 127E is at a level 135D. In between the two ends, the level of the floor 127E varies linearly between the levels 135C and 135D.

Although FIG. 8B illustrates the floor 127E of the particle-trapping segment 125N varying linearly and monotonically, in general the floor 127 of any particle-trapping segment 125 may vary in a non-linear and/or non-monotonic manner over some or all of the length 145 of the particle-trapping segment 125. For example, the floor 127 of a particle-trapping segment 125 may be non-uniform across some or all of its length 145 (e.g., it may be non-flat and/or non-smooth, it may include one or more crevices, cavities, protrusions, or other features that are not present in a particle-trapping segment 125 that has a level, flat floor 127). Similarly, because the floor 127 extends in both the x- and y-directions (i.e., it is a surface), it may have different characteristics at different locations of its surface.

In embodiments of particle-trapping segments 125 having at least one wall 128, the at least one wall 128 may be substantially vertical (i.e., approximately parallel to the z-axis illustrated in various of the drawings herein, making the transition from the floor 127 to the adjacent gap 130 step-like) or sloped. For example, in the exemplary embodiment of FIG. 8A, each of the particle-trapping segments 125J, 125K, and 127L has substantially vertical walls 128 (i.e., the walls 128A, 128B, 128C, 128D, and 128E are all substantially parallel to the z-axis, and the transition from the floor 127 to the adjacent gap 130 is substantially a step). In the exemplary embodiment shown in FIG. 8B, the particle-trapping segment 125M has one vertical wall 128F and one sloped wall 128G. The particle-trapping segment 125N has two sloped walls 128H and 128I, although the wall 128I may be considered substantially vertical. As shown by the example of FIG. 8B, the walls 128 of different particle-trapping segments 125 need not be the same, and a particular particle-trapping segment 125 may have different walls 128 with different characteristics.

FIGS. 8A and 8B illustrate particle-trapping segments 125 with smooth walls 128. In some embodiments, the at least one wall 128 of a particle-trapping segment 125 includes at least one cavity, crevice, protrusion, or other feature that results in the at least one wall 128 not being smooth. It is to be appreciated that the walls 128 of different particle-trapping segments 125 of a segmented structure 120 may have different characteristics, or they may be substantially similar. Likewise, when a particular particle-trapping segment 125 has more than one wall 128, the different walls 128 may have different characteristics.

FIGS. 8A and 8B provide examples of how the elevation of the segmented structure 120 may change along its length $L_{SS}$. Much of that discussion applies with equal force to how the elevation of a particle-trapping segment 125 may vary across its width 150. For example, FIG. 9A illustrates the elevation of a particle-trapping segment 125Q across its width 150Q. As illustrated, the particle-trapping segment 125Q has vertical and smooth walls 128K and 128L, and a smooth floor 127G at a level 135F. The floor 127G is at the level 135F over the entire width 150Q of the particle-trapping segment 125Q.

FIG. 8B illustrates an example of how the depth of a particle-trapping segment 125 may vary across its width 150. The particle-trapping segment 125R has one smooth, substantially (but not exactly) vertical wall 128M, and one non-uniform, non-smooth wall 128N. The wall 128N includes protrusions and a cavity. The floor 127H is also non-uniform and non-smooth. Where it intersects the wall 128M, the floor 127H is at a level 135G. At its lowest point, the floor 127H is at the level 135H. As FIG. 8B illustrates, the location where the floor 127 ends and a wall 128 begins might be difficult to identify in some embodiments. The distinction is unimportant, however, because both walls 128 and floors 127 may have similar features (e.g., protrusions, cavities, crevices, or any other characteristic that enables the particle-trapping segment 125 to provide the desired particle-trapping capabilities). Consequently, in this document, every particle-trapping segment 125 has a floor 127 but not necessarily one or more walls 128. It is to be understood that particle-trapping segments 125, including whatever interior surface(s) they have, can have any size, shape, and features that provide the desired particle-trapping capabilities.

Figure 9B:
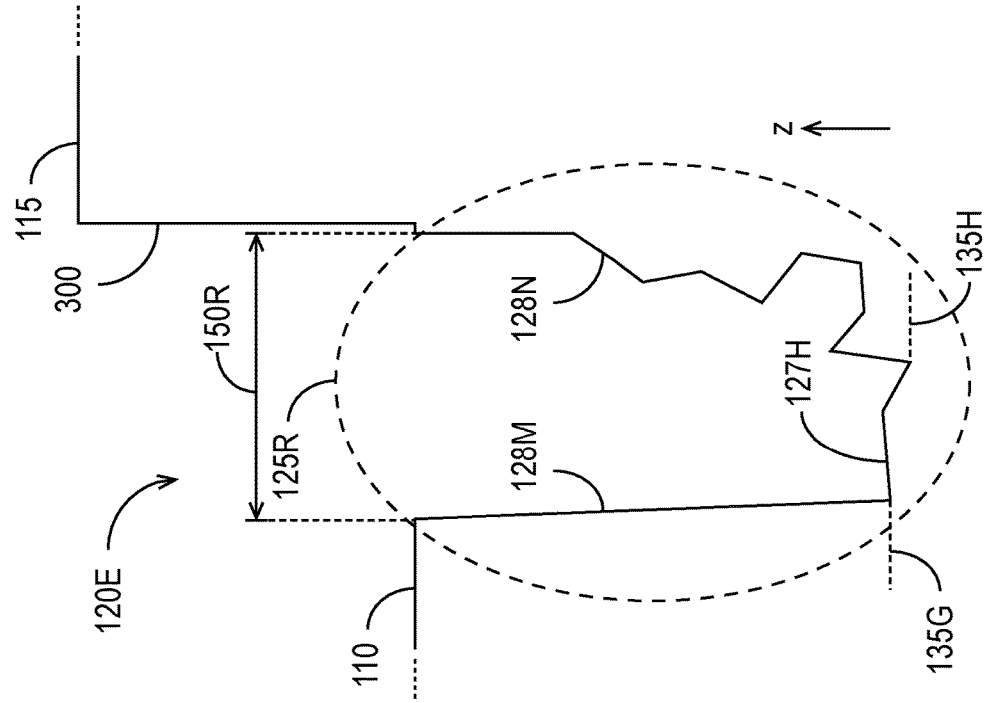
FIG. 9B illustrates the elevation of an exemplary particle-trapping segment across its width in accordance with some embodiments.
Figure 9A:
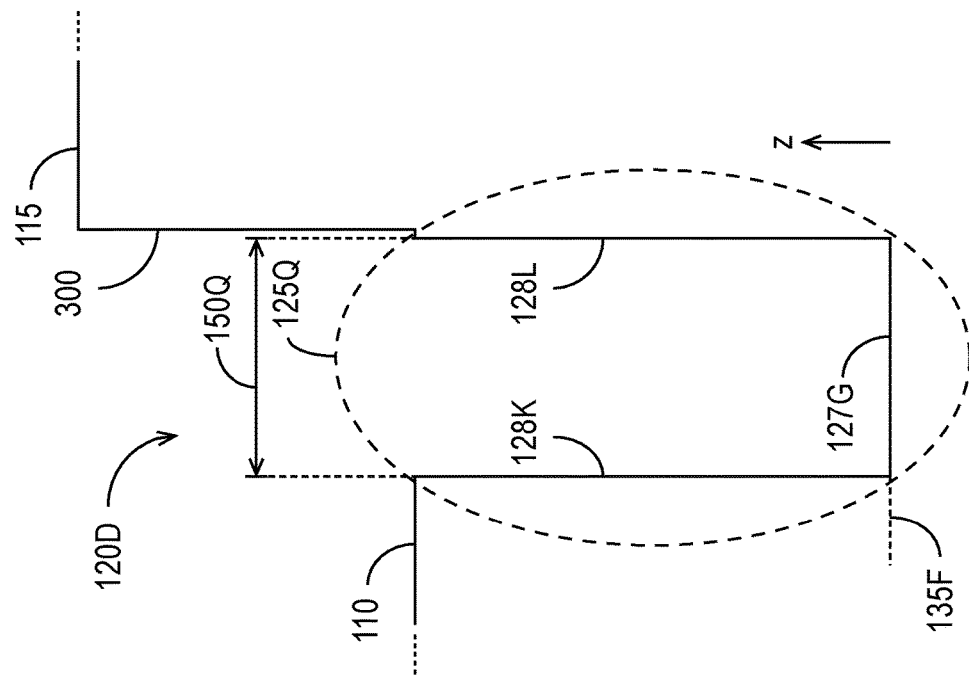
FIG. 9A illustrates the elevation of an exemplary particle-trapping segment across its width in accordance with some embodiments.

FIGS. 9A and 9B illustrate particle-trapping segments 125Q and 125R that are slightly offset from the vertical structure 300. As explained previously, the segmented structure 120 may abut the vertical structure (e.g., as shown in FIGS. 5, 6A, and 6B) or be offset like the examples shown in FIGS. 9A and 9B.

FIGS. 5, 6A, and 6B illustrate a segmented structure 120 at the base of the leading pad 605. The first and second side pads 595A, 595B are also vertical structures, and a segmented structure 120 may be disposed at or near the base of one or both of the first and second side pads 595A, 595B.

Conventionally, a slider 525 is fabricated from a wafer using a photolithography process having two steps: (a) covering a portion of a surface of the wafer, and (b) removing substrate material from the exposed (i.e., not covered) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the disk 520 when the slider 525 is used in a disk drive 500, i.e., the ABS 550. The steps (a) and (b) may be repeated multiple times to create different slider features.

In some embodiments, the segmented structures 120 disclosed herein may be fabricated using conventional techniques. Specifically, the particle-trapping segments 125 may be etched out by milling (e.g., deep ion milling) using the steps (a) and (b) discussed above. The use of conventional slider fabrication techniques may be desirable to add a segmented structure 120 to a slider without increasing its manufacturing cost or complexity. Other fabrication techniques may be used instead or in addition to fabricate more complex or different types of segmented structures 120 (e.g., to create particle-trapping segments 125 having walls 128 with protrusions, cavities, or crevices). For example, U.S. Pat. No. 9,865,284 discloses methods for manufacturing sliders using additive fabrication techniques (e.g., three-dimensional (3D) printing, stereo lithography, fused deposition modeling, selective laser sintering, multi jet modeling, etc.) to form slider features. These methods and techniques may be used to create a slider 525 having a segmented structure 120 as disclosed herein. The contents of U.S. Pat. No. 9,865,284 are hereby incorporated by reference in their entirety.

It is to be understood that the particle-trapping segments 125 shown in drawings herein are merely exemplary, and the particle-trapping segments 125 may have different and myriad shapes in the x-y plane. Likewise, the illustrated characteristics of the floors 127, walls 128 (if present), and other features of particle-trapping segments 125 are merely exemplary. In general, and as discussed above, the particle-trapping segments 125 may have any shape and characteristics that provide the desired particle-trapping capabilities.

It is also to be understood that the segmented structures 120B, 120C, 120D, and 120E of FIGS. 8A, 8B, 9A, and 9B do not necessarily correspond to any of the segmented structures 120 illustrated in other drawings (e.g., segmented structures 120B, 120C, 120D, and 120E may, but need not, illustrate a portion of the segmented structure 120A illustrated in FIGS. 5, 6A, and 6B). FIGS. 8A through 9B are provided to illustrate exemplary features of segmented structures 120 and to explain the relationships between the various elements of segmented structures 120.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

As set forth herein, as used to describe the relative positions of different layers of a slider ABS, the terms "above," "below," "higher," and "lower" are used assuming that the ABS of the slider is facing up.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A slider, comprising:
   a vertical structure extending from a first level of an air-bearing surface (ABS) of the slider to a second level of the ABS, wherein, in an orientation in which the ABS of the slider is oriented upward, the second level is above the first level; and
   a segmented structure comprising at least a first particle-trapping segment, a second particle-trapping segment, a third particle-trapping segment, a first gap between the first particle-trapping segment and the second particle-trapping segment, and a second gap between the second particle-trapping segment and the third particle-trapping segment, wherein all of the first, second, and third particle-trapping segments and the first and second gaps are adjacent to and abut the vertical structure, and wherein, in the orientation in which the ABS of the slider is oriented upward:
      a floor of the first particle-trapping segment is below the first level;
      a floor of the second particle-trapping segment is below the first level;
      a floor of the third particle-trapping segment is below the first level;
      a level of the first gap is at or below the first level;
      a level of the second gap is at or below the first level;
      the level of the first gap is above the floor of the first particle-trapping segment and above the floor of the second particle-trapping segment; and
      the level of the second gap is above the floor of the second particle-trapping segment and above the floor of the third particle-trapping segment.

2. The slider recited in claim 1, wherein the floor of the first particle-trapping segment, the floor of the second particle-trapping segment, and the floor of the third particle-trapping segment are at substantially identical levels.

3. The slider recited in claim 1, wherein at least one of the floor of the first particle-trapping segment, the floor of the second particle-trapping segment, or the floor of the third particle-trapping segment is substantially flat.

4. The slider recited in claim 1, wherein at least one of the floor of the first particle-trapping segment, the floor of the second particle-trapping segment, or the floor of the third particle-trapping segment is substantially smooth.

5. The slider recited in claim 1, wherein at least one of the floor of the first particle-trapping segment, the floor of the second particle-trapping segment, or the floor of the third particle-trapping segment includes a sloped portion.

6. The slider recited in claim 1, wherein the floor of the first particle-trapping segment, the floor of the second particle-trapping segment, or the floor of the third particle-trapping segment is non-uniform.

7. The slider recited in claim 1, wherein the floor of the first particle-trapping segment extends to a third level, the floor of the second particle-trapping segment extends to a fourth level, and the floor of the third particle-trapping segment extends to a fifth level, wherein at least two of the third, fourth, and fifth levels are different.

8. The slider recited in claim 7, wherein at least one of the third, fourth, and fifth levels is not substantially flat.

9. The slider recited in claim 1, wherein the level of the first gap is substantially the same as the level of the second gap.

10. The slider recited in claim 1, wherein a sum of a length of the first particle-trapping segment, a length of the second particle-trapping segment, and a length of the third particle-trapping segment is at least eighty percent of an overall length of the segmented structure.

11. The slider recited in claim 1, wherein a transition from at least one of (i) the floor of the first particle-trapping segment to the level of the first gap, (ii) the floor of the second particle-trapping segment to the level of the first gap, (iii) the floor of the second particle-trapping segment to the level of the second gap, or (iv) the floor of the third particle-trapping segment to the level of the second gap is substantially a step.

12. The slider recited in claim 1, wherein the vertical structure is a leading pad or a side pad.

13. A data storage device comprising the slider recited in claim 1.

14. A slider, comprising:
   a vertical structure extending from a first level of an air-bearing surface (ABS) of the slider to a second level of the ABS; and
   a segmented structure disposed adjacent to a base of the vertical structure, the segmented structure comprising at least a first particle-trapping segment, a second particle-trapping segment, and a gap disposed between the first and second particle-trapping segments, wherein a length of the gap is less than twenty percent of a length of the segmented structure, and wherein, in an orientation in which the ABS of the slider is oriented upward:
      the second level is above the first level;
      a floor of the first particle-trapping segment is below the first level;
      a floor of the second particle-trapping segment is below the first level;
      a level of the gap is at or below the first level; and
      the floor of the first particle-trapping segment and the floor of the second particle-trapping segment are below the level of the gap.

15. The slider recited in claim 14, wherein the floor of the first particle-trapping segment and the floor of the second particle-trapping segment are substantially identical.

16. The slider recited in claim 14, wherein at least one of the floor of the first particle-trapping segment or the floor of the second particle-trapping segment is substantially flat.

17. The slider recited in claim 14, wherein the floor of the first particle-trapping segment or the floor of the second particle-trapping segment is non-uniform.

18. The slider recited in claim 14, wherein the floor of the first particle-trapping segment or the floor of the second particle-trapping segment is smooth.

19. The slider recited in claim 14, wherein the floor of the first particle-trapping segment extends to a third level, and the floor of the second particle-trapping segment extends to a fourth level, wherein the third and fourth levels are different.

20. The slider recited in claim 14, wherein a transition from at least one of (i) the floor of the first particle-trapping segment to the level of the gap or (ii) the floor of the second particle-trapping segment to the level of the gap is substantially a step.

21. The slider recited in claim 14, wherein each of the first and second particle-trapping segments abuts the vertical structure.

22. The slider recited in claim 14, wherein the vertical structure is a leading pad or a side pad.

23. A data storage device comprising the slider recited in claim 14.

* * * * *